United States Patent [19]

Kueper et al.

[11] 4,224,353
[45] Sep. 23, 1980

[54] GELATIN DESSERT COMPOSITION

[75] Inventors: Theodore V. Kueper, La Grange; Thomas H. Donnelly, Western Springs, both of Ill.

[73] Assignee: Swift & Company, Chicago, Ill.

[21] Appl. No.: 936,839

[22] Filed: Aug. 25, 1978

[51] Int. Cl.$^3$ ............................................. A23L 1/04
[52] U.S. Cl. ..................................... 426/576; 426/650
[58] Field of Search ...................... 426/576, 573, 650

[56] References Cited
U.S. PATENT DOCUMENTS

| | | | |
|---|---|---|---|
| 3,889,002 | 6/1975 | Clausi | 426/576 |
| 3,904,771 | 9/1975 | Donnelly et al. | 426/576 |

*Primary Examiner*—Jeanette M. Hunter
*Attorney, Agent, or Firm*—Charles E. Bouton; Robert E. Blankenbaker

[57] ABSTRACT

A gelatin dessert composition comprising a syrup containing water, dissolved gelatin, and from about 30% to 200% by weight of the gelatin of food grade acid, preferably selected from the group consisting of citric acid, malic acid, ascorbic acid, erythorbic acid and mixtures thereof.

7 Claims, No Drawings

GELATIN DESSERT COMPOSITION

This invention relates to edible dessert products, and more particularly, relates to improved gelatin dessert compositions.

Extensive research has been conducted in the past to develop what the art terms a "cold water soluble gelatin." This term refers to gelatin which will easily go into solution in tap water without the necessity of heating. It has been well-known in the art that gelatin must be solubilized in hot water; and that to form a gel, the hot solution must be cooled to a sufficiently low temperature. This may require several hours, and is inconvenient because of the time and energy required to heat the water and the time and work required to cool the hot water/gelatin solution to form a gel. This is particularly a drawback with respect to the rapid preparation of typical gelatin dessert gels.

There are a large number of patents directed to techniques for preparing cold water soluble gelatin which can be used in the preparation of typical gelatin desserts without the use of hot or boiling water. However, to the best of our knowledge, there are presently no cold water soluble gelatin dessert products on the market. Some of the patented inventions are directed to reacting the gelatin and/or coating the gelatin with various chemical agents in order to increase solubility. For example, see U.S. Pat. Nos. 3,332,782; 2,819,970; and 2,810,971. Other patents are directed to the concept of co-drying gelatin with various quantities of sugar in order to promote solubility of the gelatin. For example, see U.S. Pat. Nos. 3,362,830; 3,341,334; 2,984,622; 2,841,498; and 2,803,548. Other patents are directed to freeze-drying techniques or other special effects. For example, see U.S. Pat. Nos. 3,595,675; 3,514,518; 2,834,683; 2,166,074; and Canadian Pat. No. 994,163.

A more pertinent prior art process and product is described in French Pat. No. 2,012,559 which teaches the preparation of cold water soluble gelatin by co-drying a solution of gelatin and an edible acid such as citric acid. The quantity of acid is between 5-20% by weight of the gelatin. It is our experience that the work done in this patent results in a gelatin product with increased tendencies toward hydration, although it will dissolve in warm water. In cold water, the gelatin particles appear to hydrate, swelling to form a gel-like composition upon cooling. However, close observation of these products indicates that the final composition is not a smooth, homogeneous gelatin gel, but rather, comprises an aggregation of swollen hydrated particles adhering together in the cold water, thus imparting a grainy texture to the product, albeit one that melts in the mouth.

The best prior art of which we are aware is embodied in U.S. Pat. No. 3,904,771 which describes cold water soluble gelatin prepared by co-drying gelatin with suitable edible acids, wherein the acid is present in amounts of from about 30-200% by weight of the gelatin. That patent contemplated a co-dried gelatin/acid composition that could be later combined with water and a buffer salt to form a gelatin dessert. It was believed, at that time, that the act of co-drying the gelatin and organic acid was, in some way, necessary for effecting a cold water soluble gelatin.

It has now been discovered that, by combining gelatin and food grade acids in water to form a syrup, the gelatin can be rendered soluble without proceeding through a co-drying step.

It is accordingly, a principal objective of this invention to provide an aqueous syrup containing completely dissolved gelatin.

It is another object of this invention to provide an improved dessert composition containing dissolved gelatin.

It is also an object of this invention to provide an improved process for preparing gelatin dessert compositions.

These and other objectives are carried out by providing an aqueous syrup containing gelatin and food grade acid. Gelatin is a product obtained by the denaturation and extraction of collagen, derived usually from skin, white connective tissue, and/or bones of animals. It is a derived protein composed of various amino acids linked between adjacent amino and carbonyl groups by a peptide bond. Type-B gelatin is prepared by swelling the raw materials (usually ossein or hide stock) in a saturated lime solution for 3-12 weeks. On the other hand, type-A gelatin is prepared by swelling raw materials (usually pork skins) in a dilute acid solution at a pH of 1 to 2 for 10 to 30 hours. The acid solution is usually prepared from hydrochloric acid, sulfurous acid, phosphoric acid or sulfuric acid. In accordance with the present invention, type-A gelatin or type-B gelatin may be utilized. The Bloom strength of the gelatin is not particularly important; however, gelatins having a Bloom strength of greater than about 200 are generally preferred.

It is well-known that the strength of the gel formed by dissolving a given amount of gelatin in water is a function of the pH of the system, with the maximum being reached at a pH of about pH 8.5 for either type A or type B gelatin. This behavior is such that a gelatin which exhibits a Bloom of 300 at a pH of 4 will exhibit a Bloom of about 312 at pH 5, 325 at pH 6, etc. This variation of Bloom with pH is more precipitous below pH 4, but the effect is totally reversible, except for any incidental hydrolysis which might occur when the gelatin is held for long periods of time at very low pH, especially as temperature is raised. We have discovered that the effect can be used advantageously to produce cold water soluble gelatin desserts, and other gelatin-based products. For the purpose of the present invention, we have found that the use of a gelatin-acid syrup is particularly advantageous for preparing a cold water soluble gelatin dessert.

While any acid which will provide the proper pH could possibly be used to formulate such syrups, it is especially advantageous to use citric, malic, ascorbic and erythorbic acids. Food grade inorganic acids, such as phosphoric, hydrochloric and sulfuric, also give the effect, but are limited in applicability by esthetics, taste, and special ionic effects. Food acids such as succinic, fumaric and glutaric are not sufficiently soluble to be attractive candidates. The more flavorful food acids such as acetic and lactic give the effect, but are limited by considerations of taste. Tartaric acid would be as desirable as citric, except that it forms relatively insoluble acid tartrates at the pH of gelatin dessert, thus causing an undesirable turbidity. Malonic and aconitic acids are generally too expensive. We prefer to use citric and malic acids in equal amounts, although any percentage combination is suitable.

Preferably, the syrup composition will comprise about 20% gelatin, about 20% edible acid, and about 60% water by weight. However, a suitable syrup can be prepared using from about 5% to 40% gelatin, from about 5% to 40% acid, and from about 20% to 90% water. The important weight relationship is that of acid to gelatin. Generally, about 30-200% acid should be present basis the weight of gelatin, and preferably from about 75% to 150% acid basis the weight of gelatin.

A sweetener or humectant, such as glycerine, sucrose or fructose, may be added to the syrup in order to provide a presweetened syrup. If sugar is not added to the gelatin/acid syrup, it will be incorporated with the buffer salts as is more fully described hereinbelow. The amount of sugar utilized will range anywhere up to 1000% basis the weight of gelatin. Also, suitable flavorings and/or colorings may be added to the syrup.

The aqueous gelatin/acid syrup will be packed in a suitable container, e.g., a plastic tube, to form one component of a multi-component dessert package. The other required component of the package will consist of a container of buffer salt or salts. The buffer salt cannot be incorporated within the syrup, prior to use in forming a dessert, inasmuch as the buffer would adjust syrup pH so as to enable the syrup solution to gel. Suitable buffer salts include sodium citrate, diammonium phosphate and disodium phosphate, with sodium citrate being greatly preferred. Sodium sulfate may be added to speed the rate of set. Also, the separate container of buffer salt will preferably contain the sugar, although as previously mentioned, it is possible to incorporate the sugar into the syrup. Like the sugar, some coloring and/or flavoring ingredients may be combined with the buffer salt. The mixture of buffer salts, sweetener, coloring and flavoring may be contained within the multi-component package in any desired physical form, e.g., syrup, paste or powder.

The buffer salt will be present in an amount to adjust final pH of the gelatin dessert product to from 3.6 to 4.6, and preferably to about 4.0. Generally, depending on the type and amount of acid used, proper final pH can be achieved by using 50-400% by weight buffer salt basis the weight of acid, and preferably 100-250% buffer salt basis the acid. If it is desired to incorporate the buffer salt and sugar as a tube of syrup within the dessert package, then from about 10-15% buffer salt by weight is combined with 40-70% sugar and 20-50% water. In preparing the syrup, one should utilize as little water as possible to form a flowable syrup.

The gelatin/acid syrup composition tends to deteriorate at room temperature over extended periods of time due to hydrolysis of the gelatin in an aqueous acid solution. Accordingly, it is preferred to store and distribute the syrup in refrigerated or frozen form. Since the present invention contemplates a package comprising two physically separate components, the gelatin/acid component and the buffer component, the complete gelatin dessert product package will normally be stored and distributed in a refrigerated or frozen form. Most preferably, both components will be syrups, stored and distributed under refrigeration.

In preparing a dessert product from the present composition, the user will merely add the separate containers of gelatin/acid syrup and buffer salts to ordinary tap water, and stir to aid dissolution. Thereafter, the solution will preferably be placed in a refrigerator to cool to promote rapid gelling. Actually, due to the fact that the gelatin solution will gel when in thermodynamic equilibrium, it will set-up to a gel without cooling if allowed to sit long enough to establish this equilibrium.

The invention is illustrated in connection with the following example:

EXAMPLE

A gelatin-acid syrup was prepared by soaking 2 parts of gelatin in 2 parts of cold water and melting when fully swelled. In this, 1 part of citric acid (monohydrate) and 1 part of malic acid were dissolved. Suitable flavor and color were added, and the clear syrup placed in a plastic tube and sealed.

A neutralizer-sweetener powder was prepared by mixing 4 parts of sodium citrate dihydrate with 15 parts of sugar.

A cup of dessert was prepared by dissolving 30 grams of the above syrup in a cup of water, and dissolving 95 gms of the powder in this solution.

While the present invention has been described in reference to specific embodiments, it should be obvious to one skilled in the art that many modifications and variations of the invention as hereinbefore set forth may be made without departing from the spirit and scope thereof, and therefore, only such limitations should be imposed as are indicated in the appended claims.

The embodiments of the invention in which an exclusive property or privilege is claimed are defined as follows:

1. A gelatin dessert starter product comprising two associated, but physically discrete, components, the first component being a syrup containing by weight, from 20-90% water, from 5-40% gelatin and from 5-40% edible acid selected from the group consisting of citric acid, malic acid, ascorbic acid, erythorbic acid, and mixtures thereof, wherein the acid is present at a level of from 30-200% basis the weight of gelatin, and said second component comprising a buffer salt in an amount sufficient to adjust final pH of the dessert to from 3.6 to 4.6.

2. The product of claim 1 wherein the buffer salt is combined with sugar which is present in an amount up to 1000% basis the weight of gelatin.

3. The product of claim 2 wherein the acid is present at a level of 75-150% basis the weight of gelatin.

4. The product of claim 3 wherein the buffer salt and sugar component is present as a syrup containing 10-15% by weight buffer salt, 40-70% sugar and 20-50% water.

5. The product of claim 3 wherein the acid is a combination of citric and malic acids, and wherein the buffer salt is sodium citrate.

6. The product of claim 4 wherein both the gelatin/acid syrup and buffer/sugar syrup components are present in a refrigerated or frozen form.

7. The product of claim 5 wherein the buffer salt is present in an amount to adjust final dessert pH to about 4.0.

* * * * *